United States Patent
Yu et al.

(10) Patent No.: US 8,074,136 B2
(45) Date of Patent: Dec. 6, 2011

(54) ERROR CORRECTION APPARATUS AND METHOD FOR DIGITAL DEVICE

(75) Inventors: Bo Hyun Yu, Euiwang-si (KR); Jong Hyeok Im, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1050 days.

(21) Appl. No.: 11/943,292

(22) Filed: Nov. 20, 2007

(65) Prior Publication Data

US 2008/0148121 A1    Jun. 19, 2008

(30) Foreign Application Priority Data

Dec. 18, 2006   (KR) ........................ 10-2006-0129113

(51) Int. Cl.
- G06F 11/00  (2006.01)
- G06F 11/30  (2006.01)
- G08C 25/00  (2006.01)
- H03M 13/00  (2006.01)
- H04L 1/00   (2006.01)

(52) U.S. Cl. ......... 714/746; 714/758; 714/799; 714/801

(58) Field of Classification Search .................. None
See application file for complete search history.

(56) References Cited

U.S. PATENT DOCUMENTS

| | | | | |
|---|---|---|---|---|
| 5,479,421 | A * | 12/1995 | Takebe | 714/822 |
| 7,257,763 | B1 * | 8/2007 | Srinivasan et al. | 714/764 |
| 7,457,212 | B2 * | 11/2008 | Oh | 369/47.14 |
| 7,543,216 | B1 * | 6/2009 | Plants | 714/763 |
| 7,725,803 | B1 * | 5/2010 | Tang et al. | 714/758 |
| 2005/0117601 | A1 * | 6/2005 | Anderson et al. | 370/465 |
| 2010/0070830 | A1 * | 3/2010 | Ngo | 714/763 |

* cited by examiner

*Primary Examiner* — Jeffrey A Gaffin
*Assistant Examiner* — Guerrier Merant
(74) *Attorney, Agent, or Firm* — The Farrell Law Firm, P.C.

(57) ABSTRACT

An improved error correction apparatus and method for a digital device are provided. An error correction apparatus includes at least one client module outputting an error detection signal, if an error is detected; and a controller for analyzing the error and controlling the client module to correct the error, if an error detection signal is received. An error correction apparatus and method of the present invention is provided with shadow registers or CRC registers for quickly detecting errors of status registers of a client module, whereby an error of the client module can be quickly detected and corrected.

11 Claims, 4 Drawing Sheets

ERROR CORRECTION APPARATUS AND METHOD FOR DIGITAL DEVICE

PRIORITY

This application claims priority to an application entitled "ERROR CORRECTION APPARATUS AND METHOD FOR DIGITAL DEVICE" filed in the Korean Intellectual Property Office on Dec. 18, 2006, and assigned Serial No. 2006-0129113, the contents of which are incorporated herein by reference.

BACKGROUND OF THE INVENTION

1. Field of the Invention

The present invention relates to a digital device and, in particular, to an improved error correction apparatus and method for a digital device.

2. Description of the Related Art

Typically, a digital device, such as a mobile phone, MP3 player, and Personal Digital Assistant (PDA), incorporates various client modules such as a Liquid Crystal Display (LCD) module and camera module.

Errors induced by electrostatic discharge (ESD) or noise may cause a client module to malfunction. For example, the LCD module may show a white screen caused by a signal error.

In order to prevent the client module from malfunctioning, a polling mechanism is used such that a host periodically polls a register of the client module. In the case of polling-based error correction mechanism, when an error has occurred, the functionality of the client module may be restored by specific user interaction.

In the polling-based error correction mechanism, a host periodically polls registers of its client modules for detecting an error with reference to the values of the registers, so the client modules can be protected or restored from errors.

In the case of error correction by user interaction, the user is required to interact with the device for restoring the functionality of the client module from an error. For example, when a white error screen is displayed at an LCD module, the error is corrected by cycling power to the LCD module (for example, by folding up and down a clamshell mobile phone or sliding up and down a sliding phone).

However, these conventional error correction methods have the following drawbacks.

In the case of polling-based error correction method, a host would poll the registers of the client modules, resulting in power consumption. Also, since the digital devices have timing dependent characteristics, polling may cause error correction delay and timing errors. For example, if a polling timing is off while the host polls a register of a contact detection module in order to detect an error that occurs during a game, the input signal would fail such that the new game score is lost.

In the case of user interaction-based error correction method, although the error correction may just be a trivial matter, however, it may cause inconvenience and when a specific code is repeated for a number of times, it results in reduction of lifespan of the client module. For example, whenever power to the LCD module is cycled for correcting the white error screen, the LCD module should repeat initialization process.

SUMMARY OF THE INVENTION

The present invention solves the above problems, and it is an object of the present invention to provide an improved error correction apparatus and method for a digital device that are capable of quickly detecting and correcting an error.

It is another object of the present invention to provide an improved error correction apparatus and method for performing error correction without generating a software load.

In accordance with an aspect of the present invention, an error correction apparatus for a digital device achieves the above and other objects. The error correction apparatus includes at least one client module outputting, if an error is detected, an error detection signal; and a controller for analyzing, if an error detection signal is received, the error and controlling the client module to correct the error.

Preferably, the client module includes a plurality of status registers for storing values resulted from an operation of the client module; and a plurality of shadow registers paired with respective status registers, each of the shadow register being empty in normal state.

Preferably, the client module includes a plurality of status registers for storing values resulted from an operation of the client module; a Cyclic Redundancy Check (CRC) logic device for reading the values of the status registers and performing cyclic redundant check on the values; a pair of CRC registers connected to the CRC logic device for storing an output value of the CRC logic device; and a comparator for comparing the values stored in the CRC registers and outputting an error detection signal when the two values are different from each other.

In accordance with another aspect of the present invention, the above and other objects are accomplished by an error correction method for a digital device having a client module and a controller for controlling the client module. The error correction method includes storing operational results of the client module; outputting, when an error is detected on the basis of the operational results, an error detection signal to the controller; and controlling, at the controller, the client module to correct the error on the basis of the error detection signal.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Figure 1:
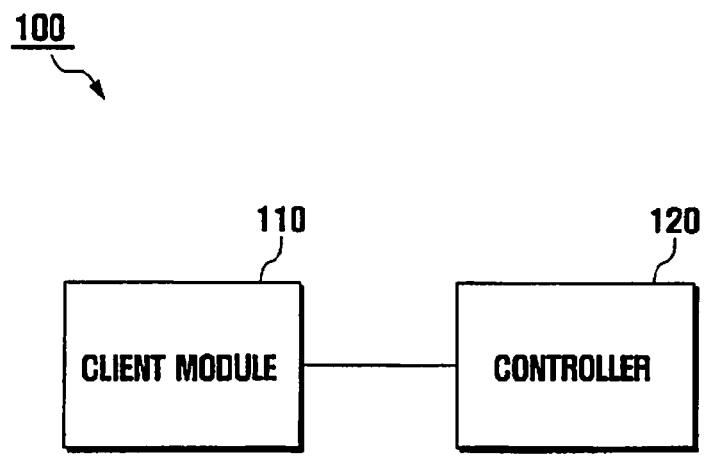
FIG. 1 is a block diagram illustrating an error correction apparatus according to the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Note that the same or similar elements in the drawings are designated by the same reference numerals as much as possible although they are shown in different drawings.

Referring to FIG. 1, the error correction apparatus 100 includes at least one client module 110, which detects an error and output an error occurrence signal, and a controller 120 which recognizes an error in accordance with the error occurrence signal and performs an error correction process.

Client module 110 can be one of a display module, a camera sensing module, and a contact detection module. Client module 110 can be implemented in two types.

Figure 2:
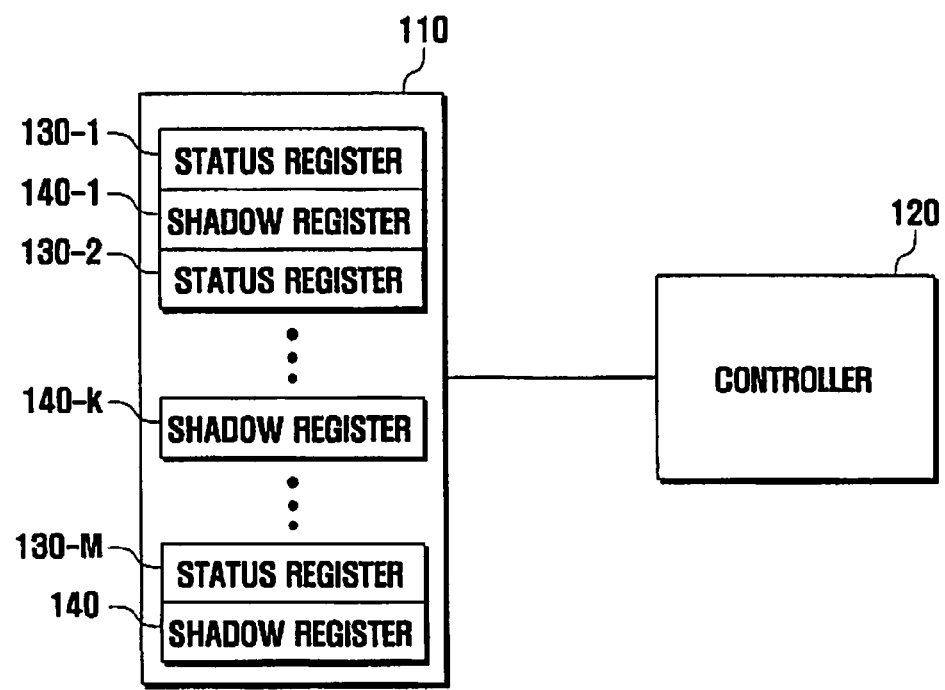
FIG. 2 is a block diagram illustrating the configuration of an error correction apparatus for a client module according to the present invention.

Referring to FIG. 2, client module 110 includes a plurality of status registers 130-1 to 130-M for storing status values and a plurality of shadow registers 140-1 to 140-N that are empty.

A shadow register 140-*k* (k=1, 2, N) is written to and outputs an interrupt to controller 120 when an error occurs at client module 110. That is, if a value of the status register is changed by an ESD or an error, the shadow register (140-*k*) is written to. The shadow register 140-*k* generates an interrupt whether a value is written.

Upon receiving an interrupt from shadow register 140-*k*, controller 120 recognizes that an error occurs in client module 110 having the shadow register 140-*k* so as to perform an error correction process. At this time, controller 120 clears shadow register 140-1. In order to correct the error, controller 120 can check the status register paired with shadow register 140-*k*. Also, shadow register 140-*k* may provide controller 120 with the status value written to the status register when the error occurs.

Figure 3:
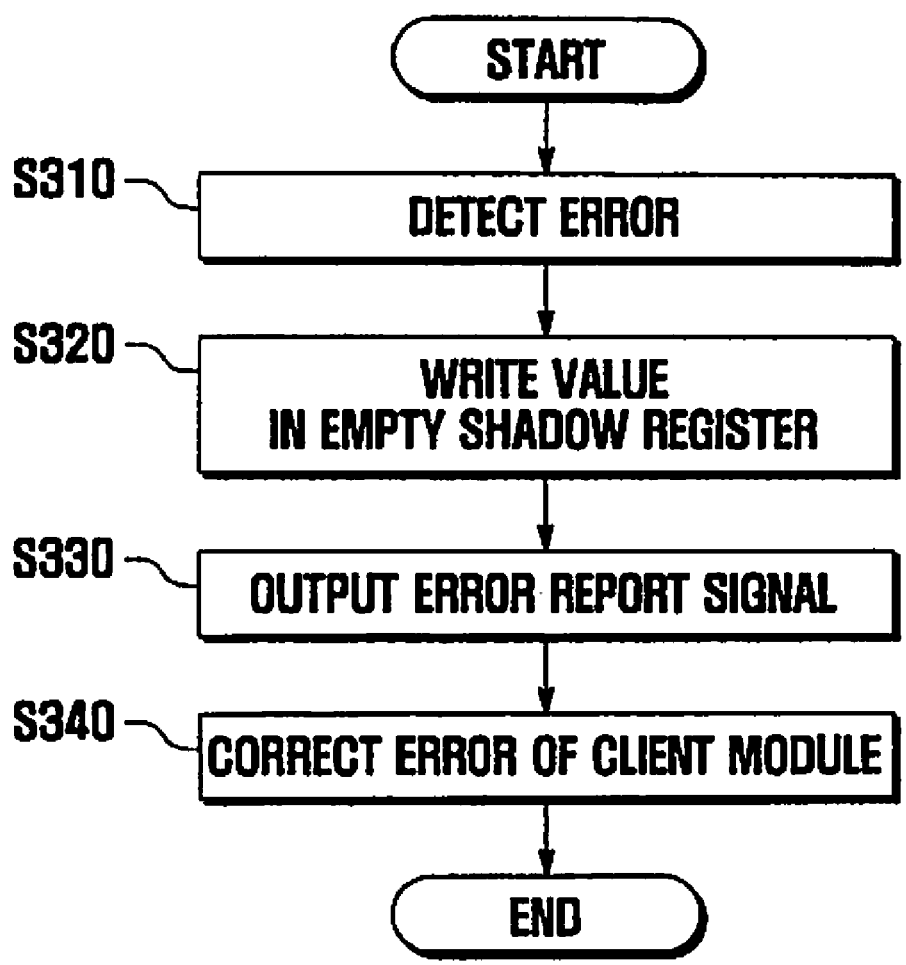
FIG. 3 is a flowchart of an error correction method according to the present invention.

Referring to FIG. 3, the error correction method includes recording a register value at the time when an error occurs in steps S310 and S320, outputting an interrupt for alerting the occurrence of an error in step S330, and correcting the error of the client module on the basis of the interrupt in step S340.

If an error is detected in step S310, a value is written to empty shadow register 140-*k* at step S320. Shadow register 140-*k* updated by a value outputs an interrupt signal to controller at step S330. Next, controller 120 performs an error correction to corresponding client module 110 at step S340.

Figure 4:
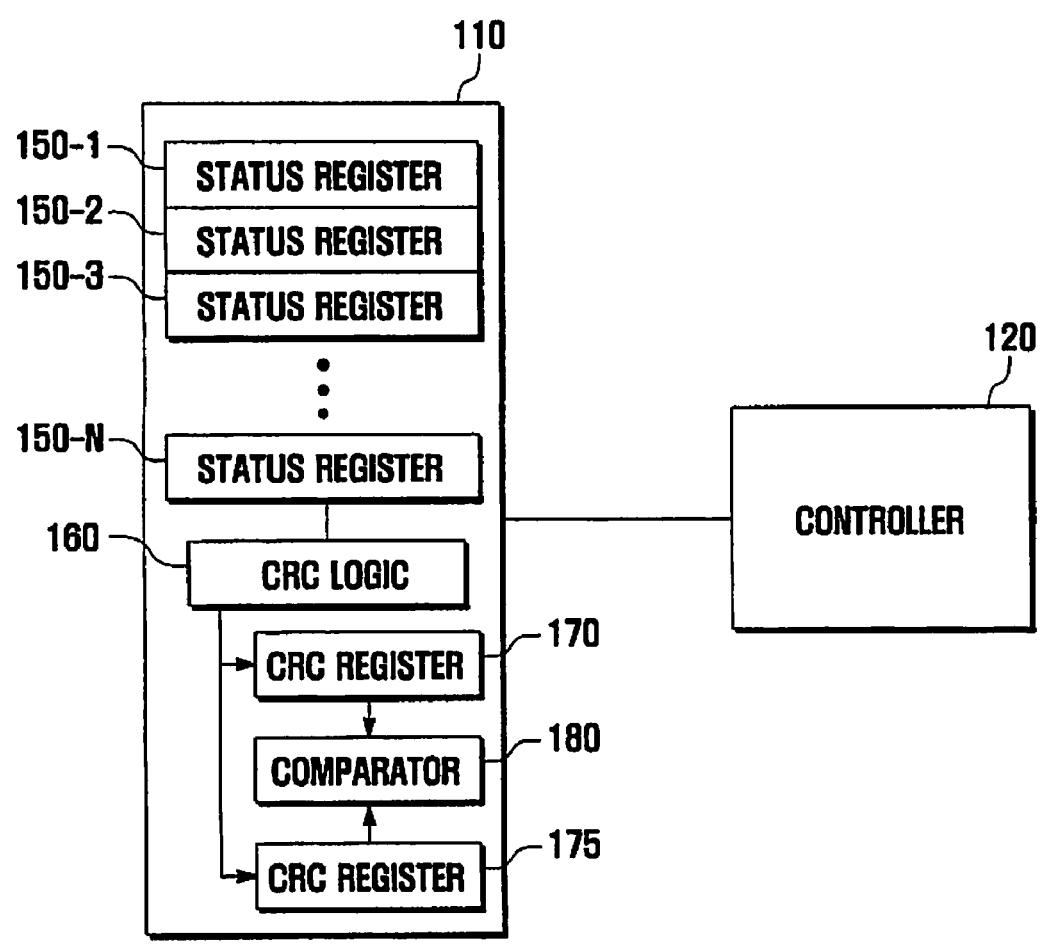
FIG. 4 is a block diagram of a configuration of an error correction apparatus for a client module according to the present invention.

Referring to FIG. 4, client module 110 includes a plurality of status registers 150-1 to 150-N for storing status value as an operation result, a plurality of Cyclic Redundancy Check (CRC) logic device 160 for periodically reading the status registers 150-1 to 150-N for CRC checks, a first and second CRC registers 170 and 175 for storing the output value of CRC logic 160, and a comparator 180 for comparing the values of the first and second CRC registers 170 and 175 and outputting an error report signal if the values of the first and second CRC registers 170 and 175 are different from each other.

The first and second CRC registers 170 and 175 store the same output of CRC logic device 160 and second CRC register 175 is disconnected with controller 120 upon storing the output value of CRC logic device 160. If the values of status registers 150-1 to 150-N are changed by an error, CRC logic device 160 outputs a new value and only the value of first CRC register 170 is changed. Accordingly, first and second CRC registers 170 and 175 have different values. In this case, comparator 180 regards the difference between the first and send CRC registers 170 and 175 as an error occurrence so as to output an error report signal. Upon receiving the error report signal, controller 120 recognizes the error occurrence in the corresponding client module so as to perform an error correction process. At this time, controller 120 can check status registers 150-1 to 150-N for analyzing a cause of the error.

For example, comparator 180 can be implemented with an XOR gate. In this case, comparator 180 outputs 0 when the two output values of the CRC registers 170 and 175 are identical with each other and outputs 1 when the two output values of the CRC registers 170 and 175 are different from each other. If the output value of comparator 180 is 0, controller 120 determines that client module 110 operates in normal state. On the other hand if the output value of comparator 180 is 1, controller 120 determines that an error has occurred in client mobile 110 so as to perform error correction.

CRC logic device 160 and second CRC register 175 are connected again and then disconnected according to a connection command from the control of controller 120.

Figure 5:
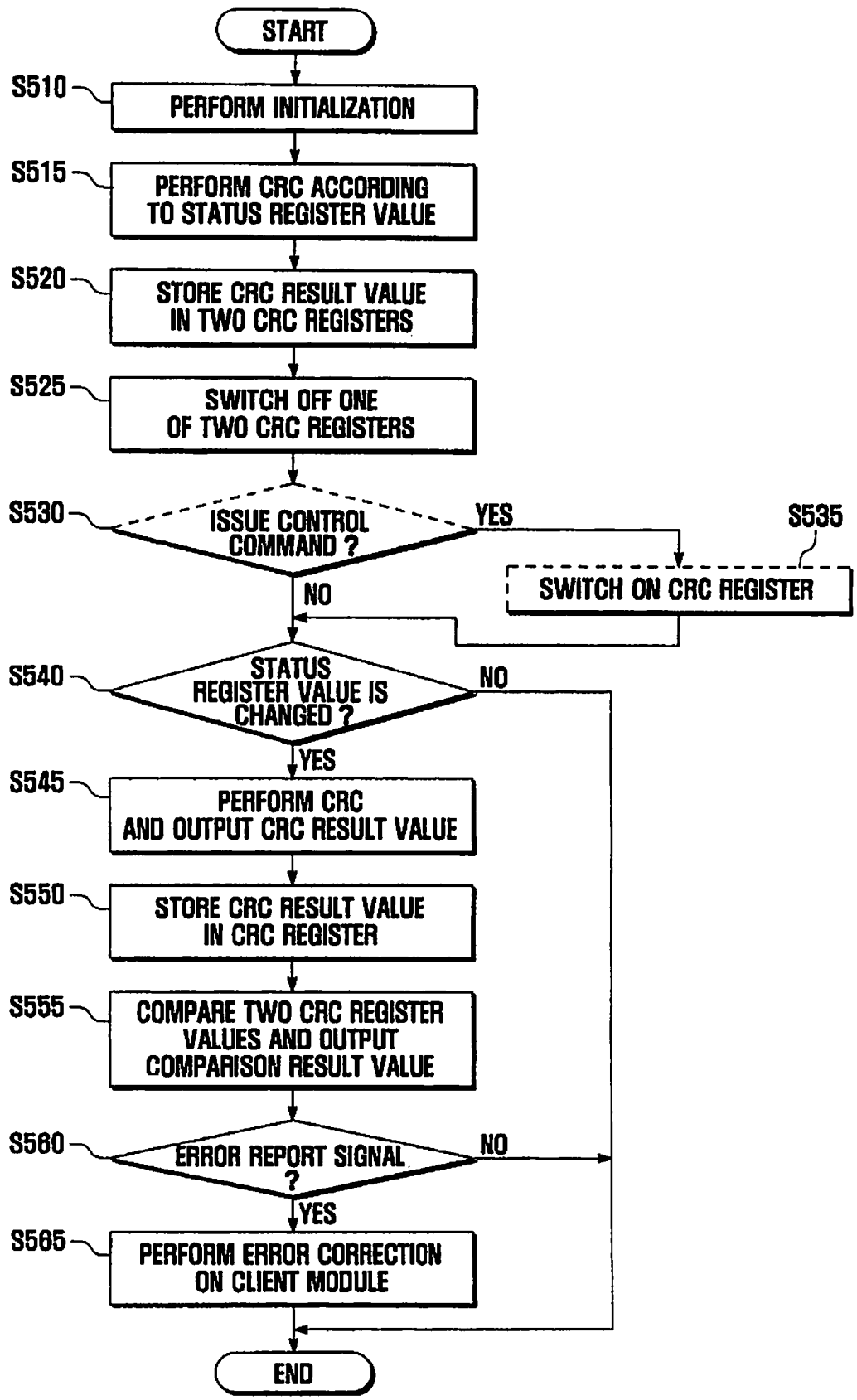
FIG. 5 is a flowchart of an error correction method according to the present invention.

Referring to FIG. 5, the error correction method includes initializing an error correction function in step S510; performing cyclic redundancy check on the status register values in step S515; storing the CRC check results in CRC registers 170 and 175 in step S520; disconnecting one of the CRC registers from CRC logic device 160 in step S525; determining if the status register values are changed in step S540; performing, if the status register values are changed, CRC and outputting CRC results in step 545; storing the CRC check results into CRC registers 170 and 175 in step S550; determining if an error occurs by comparing two CRC register values in step S560; and performing, if an error has occurred, an error correction on the client module in step S565. The error correction method can further include determining if a control command is received in step S530 after disconnecting the CRC register from the CRC logic device 160 in step S525 and connects the CRC register and the CRC logic device again in step S535.

After the initialization is completed at step S510, client module 110 performs CRC on status registers 150-1 to 150-N at step S515. The CRC result value is stored within two CRC registers 170 and 175 in step S520. After the CRC result value is stored, controller 120 controls to disconnect one of two CRC registers 170 and 175 at step S525. Next, controller 120 determines if a control signal from client module 110 is detected in step S530. If the control signal from client module 110 is detected, controller 120 controls to connect the disconnected CRC register to CRC logic device 160 again in step S535. If no control signal is detected, the disconnection state of the CRC register is maintained. Meanwhile, controller 120 determines whether the status register values are changes in step S540. If the status register values are changed, controller 120 performs CRT and outputs CRT result values in step S545.

Controller 120 controls to store the CRC result value within the CRC register to CRC logic device 160 in step S550. After the CRC result value is stored, comparator 180 compares the CRC register values stored in the two CRC registers and outputs a comparison result value to controller 120 in step S555. Controller 120 determines if an error has occurred in client module 110 on the basis of the comparison result value in step S560. If it is determined that an error has occurred in client module 110, controller 120 performs an error correction process in step S565. The comparison result value generated by two different CRC register values is regarded as an error detection signal.

As described above, an error correction apparatus and method of the present invention is provided with shadow registers or CRC registers for quickly detecting errors in the status registers of a client module, whereby the error can be quickly detected and corrected. Accordingly, the error correction apparatus and method of the present invention is advantageous to reduce software load for detecting an error and preventing a client module from malfunctioning, resulting in improvement of user convenience and device reliability.

Although exemplary embodiments of the present invention are described in detail hereinabove, it should be clearly understood by an artisan of ordinary skill in the art that many variations and/or modifications may be made to the basic inventive concepts herein taught and still fall within the spirit and scope of the present invention, as further defined in the appended claims.

What is claimed is:

1. An error correction apparatus for a digital device, comprising:
   at least one client module outputting an error detection signal, if an error is detected; and
   a controller for analyzing the error and controlling the client module to correct the error, if an error detection signal is received,
   wherein the client module comprises:
   a plurality of status registers for storing results from an operation of the client module; and
   a plurality of shadow registers paired with respective status registers, each of the shadow registers being empty in a normal state.

2. The error correction apparatus of claim 1, wherein each shadow register is written to when an error occurs.

3. The error correction apparatus of claim 2, wherein the shadow register outputs an interrupt when being written to.

4. The error correction apparatus of claim 3, wherein the controller clears the shadow register when the error is corrected.

5. An error correction apparatus for a digital device, comprising:
   at least one client module outputting an error detection signal, if an error is detected; and
   a controller for analyzing the error and controlling the client module to correct the error, if an error detection signal is received,
   wherein the client module comprises:
   a plurality of status registers for storing results from an operation of the client module;
   a Cyclic Redundancy Check (CRC) logic device for reading the contents of the status registers and performing cyclic redundant check on the contents;
   a pair of CRC registers connected to the CRC logic device for storing an output of the CRC logic device; and
   a comparator for comparing the contents of the pair of CRC registers and outputting an error detection signal when the two contents are different from each other, and
   wherein the controller disconnects a second CRC register of the pair of CRC registers from the CRC logic device, after the output of the CRC logic device is stored in the pair of CRC registers.

6. The error correction apparatus of claim 5, wherein the second CRC register is reconnected to the CRC logic device if a control command is output from the controller.

7. The error correction apparatus of claim 5, wherein the CRC logic device performs, if a content of status register is changed by a error, a CRC operation and outputs the performed CRC operation result.

8. The error correction apparatus of claim 7, wherein the contents of the first and second CRC registers are different when an error occurs.

9. An error correction method for a digital device having a client module and a controller for controlling the client module, comprising:
   performing a cyclic redundancy check (CRC) of status register values of the client module after initialization;
   storing a CRC result in CRC registers;
   disconnecting one of the CRC registers from a CRC logic device;
   updating the CRC result by performing the cyclic redundancy check when the status register is changed;
   comparing the updated CRC result and the stored CRC result; and
   performing error correction if the updated CRC result and the stored CRC result differ from each other.

10. The error correction method of claim 9, wherein disconnecting one of CRC registers comprising:
    determining whether a control signal from the client module is detected; and
    connecting, if the control signal is detected, the disconnected CRC register to the CRC logic device.

11. The error correction method of claim 9, wherein performing an error correction comprises:
    outputting, at the client module, a comparison result signal;
    determining if the comparison result signal is an error report signal; and
    starting, if the comparison result signal is an error report signal, the error correction.

* * * * *